(No Model.)

P. W. TILLINGHAST.
PNEUMATIC TIRE.

No. 497,971. Patented May 23, 1893.

Witnesses.
Charles Hannigan
James W. Bruman

Inventor.
Pardon W. Tillinghast

UNITED STATES PATENT OFFICE.

PARDON W. TILLINGHAST, OF PROVIDENCE, RHODE ISLAND.

PNEUMATIC TIRE.

SPECIFICATION forming part of Letters Patent No. 497,971, dated May 23, 1893.

Application filed September 2, 1892. Serial No. 444,888. (No model.)

To all whom it may concern:

Be it known that I, PARDON W. TILLINGHAST, a citizen of the United States, residing at Providence, in the State of Rhode Island, have invented a new and useful Improvement in Pneumatic Tires, of which the following is a specification.

Heretofore, pneumatic tires have been constructed with an interior air tube of vulcanized rubber, provided with a covering of canvas, and a separately vulcanized outer rubber covering having all its joints and parts cemented together after vulcanization. Tires so constructed, however, are liable to be rendered useless, owing to the chafing and wear of the parts in contact with each other, and the cemented joints are liable to separation under the strain caused by the constant flexing of the tire at the tread.

It is the object of my invention to provide a tire which will be free from internal chafing, and that will have no joints or parts cemented or otherwise connected after vulcanization, to become separated by use, and that can also be more readily attached to the rim of the wheel, and be easily repaired.

My invention consists in the combination of an annular inner rubber air tube, an outer rubber covering, and an intervening layer of braided or woven fabric, the several parts being joined to form a complete annular tire, while the rubber is in an unvulcanized condition, and then, all vulcanized together, so that the textile layer will become attached by the process of vulcanization, to both the inner rubber tube, and the outer rubber covering; and when a loosely woven or braided fabric is employed, the air tube and the outer rubber covering will also be united to each other through the interstices of the fabric, the textile covering of the air tube serving to prevent the bursting of the said tube when subjected to pressure, and at the same time allowing the side walls of the tire to yield freely when passing over an uneven surface.

Figure 1:
Figure 2:
Figure 4:
Figure 5:
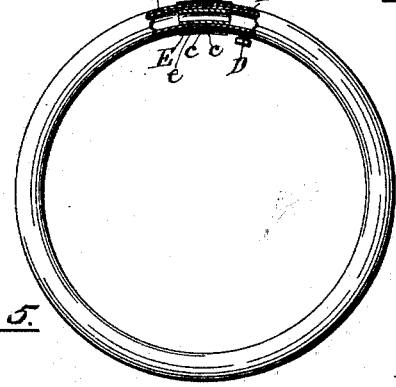
Figure 6:
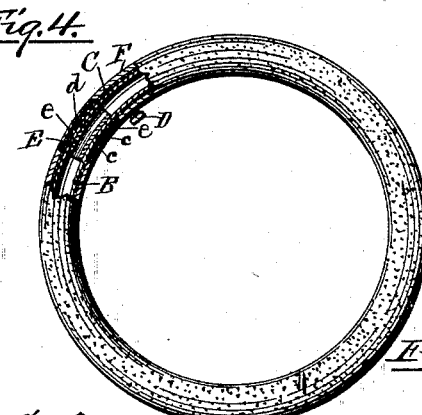
Figure 3:
Figure 7:
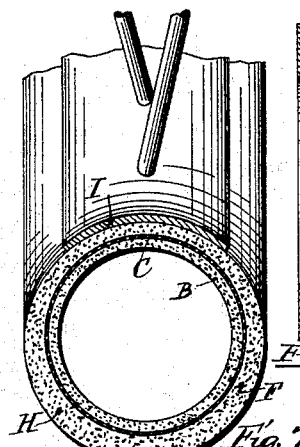
Figure 8:
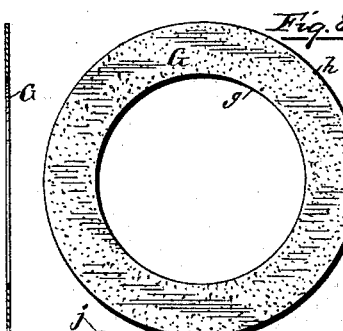
Figures 10, 11:
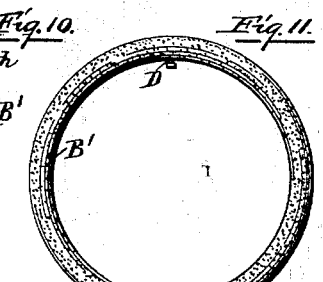
Figures 9, 12, 13, 14:
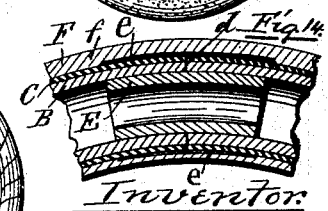

In the accompanying drawings Figure 1, represents a side view of the forming mandrel, provided with a thin covering of unvulcanized rubber to form the air tube. Fig. 2, represents the same when enveloped with a seamless covering of braid. Fig. 3, represents the unvulcanized rubber covering, when enveloped with canvas. Fig. 4, represents the rubber tube, and its textile covering, as removed from the mandrel preparatory to joining the ends to form the annular air tube for the tire, a short longitudinal section of which, shows the edges of the fabric, and the unvulcanized rubber. Fig. 5, represents a side eletion of the annular air tube formed by joining the ends of the unvulcanized rubber tube shown in Fig. 4, a portion of the tube being broken away to show the preferred mode of forming the joint. Fig. 6, represents a side elevation of the annular air tube shown in Fig. 5, when provided with the unvulcanized outer rubber covering of the tire, a portion being broken away to show the inner air tube. Fig. 7, represents an enlarged transverse section of the completed, vulcanized tire, and the rim of the vehicle wheel to which it is attached. Fig. 8, represents an annular sheet rubber blank, adapted to form the air tube without the employment of the mandrel. Fig. 9, represents a diametrical section taken in the line 9, 9, of Fig. 8. Fig. 10, represents a diametrical section, when the blank has been rolled up to form the annular tube. Fig. 11, represents a side elevation of the rubber air tube so formed, and provided with a valve tube. Fig. 12, represents the inflated annular rubber air tube shown in Fig. 11, when provided with a covering of canvas. Fig. 13, represents a modification in the formation of the annular rubber air tube for the foundation of the tire. Fig. 14, represents an enlarged detail section of the connecting joint in the air tube as shown in Figs. 5 and 6.

In the accompanying drawings A, represents the mandrel upon which the initial rubber tube for the annular air tube of the tire, is formed, and $b$ represents a thin coating of unvulcanized sheet rubber placed upon the mandrel, and adapted to form the said initial tube B. A covering C of textile fabric is then placed over the tube B, and this textile fabric may be either a seamless covering of circular braid $a$, as shown in Fig. 2, or an equivalent seamless woven fabric, or a covering of canvas $a'$, shown in Fig. 3, which canvas covering may be applied in any suitable manner.

Upon the application of the textile covering C to the initial rubber tube B, the whole may be removed from the mandrel and provided with the valve tube D, as shown in the elevation and partial longitudinal section Fig. 4. The ends c, c, of the tube B, are then brought together abutting each other, as shown in Fig. 5, and I preferably insert a tubular rubber bushing E, across the joint d, to strengthen the joint. The said joint is also strengthened by an outer covering e of canvas, or other suitable material, and I preferably treat the surfaces thus brought in contact, with a rubber solution, or naptha, or other solvent of rubber. The outer rubber covering F, is then put on in any suitable manner, but I prefer to take a flat strip of unvulcanized rubber of sufficient width to encompass the annular tube B, and its textile envelope, and lap it around the same, connecting the edges of the strip wherever they meet. The annular tire thus formed is then completed by vulcanization in a circular mold.

During the process of vulcanization, the air tube B, is inflated for the purpose of firmly uniting the layers and parts composing the tire, and forming them to the mold. This may be done by introducing sufficient heated steam into the air tube B, which will also serve to vulcanize the tire, but I prefer to inflate the said tube with air, or by other suitable means, and apply the necessary heat through the mold.

A sufficiently complete union between the layers of rubber and fabric, and the parts and surfaces to be united, may be secured by means of rubber solution, prior to the process of vulcanization, and attention is called to the fact that not only are the general surfaces of the tube and fabric brought together before vulcanization but also the ends of the air tube and of the outer rubber covering, so that the joints formed by the union of these ends, are vulcanized at the same time, and by the same process with the vulcanization of the other parts.

Instead of forming the air tube upon a mandrel and joining the ends it may be formed from an unvulcanized annular sheet rubber blank G, Fig. 8, which is shown in section in Fig. 9, the said blank being folded over to join the inner and outer edges g and h and thus form an annular tube B' as shown in Figs. 10 and 11, and provided with the inflating valve tube D. I now inflate the closed air tube B' and wind the same with strips of canvas to form the textile covering C as shown in Fig. 12, after which, the outer rubber covering F is then to be applied as hereinbefore described.

Instead of employing a single annular blank G, of sheet rubber, two similar blanks G' of narrower width, may be employed, the edges i and j of the same, being brought together and cemented, as shown in Fig. 13. The completed vulcanized tire H, shown in transverse section in Fig. 7, may be secured to the rim I of the wheel, in any suitable manner, and the outer rubber covering F is preferably made thicker on the outer or tread portion f of the tire. This outer covering F can be applied when the tube B is on the mandrel, but it is preferred to apply the said covering to the annular tube as described.

When the tire constructed as above described has been perforated by any pointed object encountered in the road, the said tire may be readily repaired by injecting rubber cement into the perforation, and allowing it to dry therein, such repairs being more readily effected than in the tire made as heretofore in several separate layers or tubes; and furthermore, the integral vulcanized tire can be more readily and firmly attached to the rim of the wheel.

I claim as my invention—

1. A pneumatic tire, consisting of a rubber air tube, and outer covering, substantially as specified, with the ends of the air tube and other component parts securely united by vulcanization, substantially as described, thereby constituting an integral complete tire.

2. A pneumatic tire, composed of a rubber tube, an intermediate layer of fabric, and an outer covering of rubber, substantially as described, having all its rubber joints and component parts simultaneously vulcanized together, forming an integral annular tire.

3. A pneumatic tire, composed of an inner rubber air tube, having its original ends connected by means of an internal rubber bushing, an outer rubber covering, and an intervening layer of fabric, all the parts being vulcanized together, forming an integral tire.

4. A pneumatic tire, composed of an inner rubber air tube, covered with fabric, and having its original ends connected by means of an internal rubber bushing, and the joint strengthened by an outer layer or winding of fabric, and an outer rubber covering inclosing the original tube and its strengthening layer, all the parts being vulcanized together, forming an integral tire.

5. A pneumatic tire, composed of an inner rubber air tube, covered with textile fabric, and having its original ends connected and strengthened at the joint, by an outer layer or winding of fabric, and an outer rubber covering, inclosing the original tube and its strengthening layer, all the parts being vulcanized together forming an integral tire.

PARDON W. TILLINGHAST.

Witnesses:
SOCRATES SCHOLFIELD,
JAMES W. BEAMAN.